T. LEONARD.
Vegetable-Chopper.
No. 207,748. Patented Sept. 3, 1878.
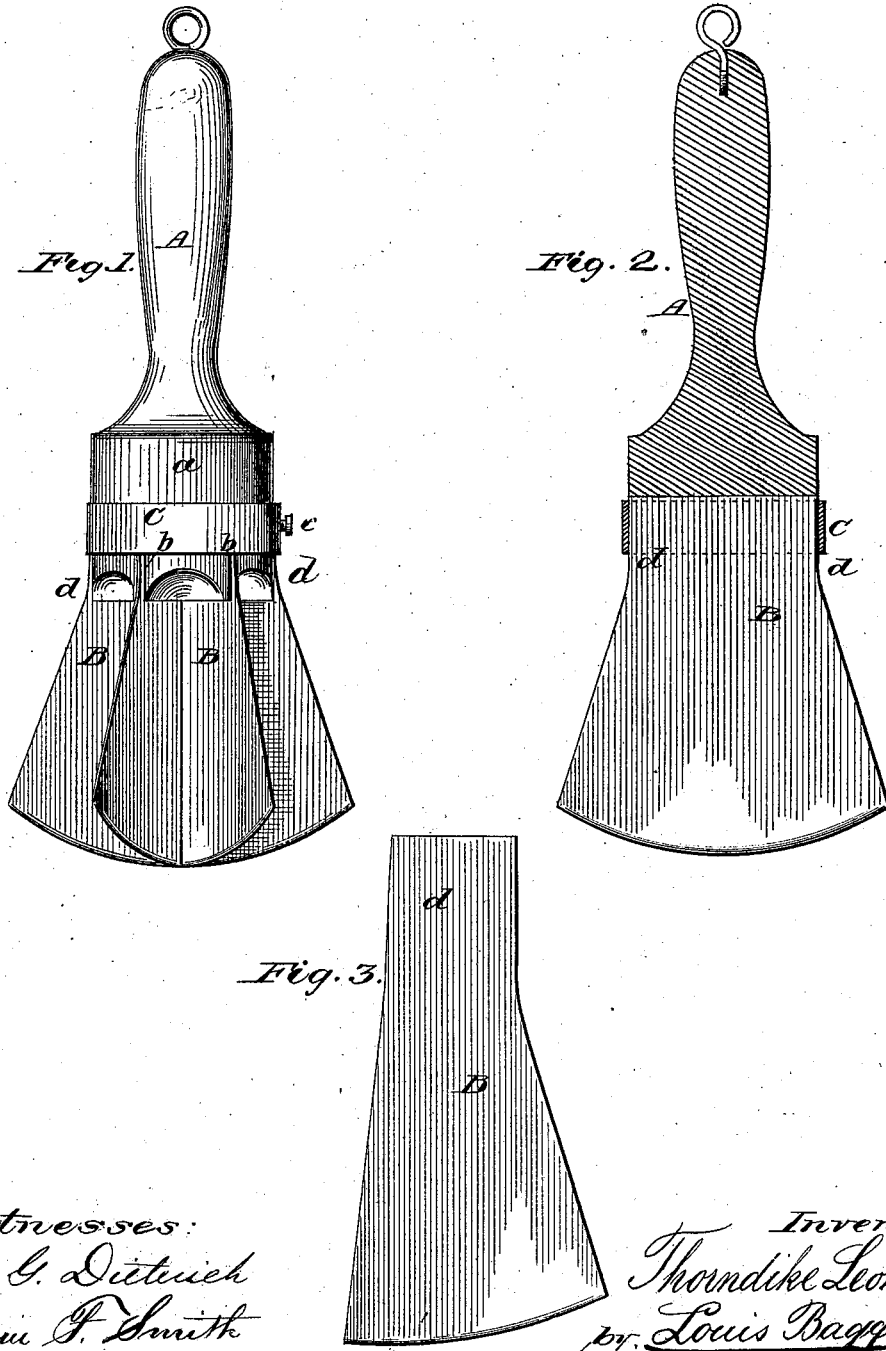

UNITED STATES PATENT OFFICE.

THORNDIKE LEONARD, OF GRAFTON, MASSACHUSETTS.

IMPROVEMENT IN VEGETABLE-CHOPPERS.

Specification forming part of Letters Patent No. 207,748, dated September 3, 1878; application filed July 22, 1878.

*To all whom it may concern:*

Be it known that I, THORNDIKE LEONARD, of Grafton, in the county of Worcester and State of Massachusetts, have invented certain new and useful Improvements in Vegetable-Choppers; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 is a side elevation of my improved vegetable or chopping knife. Fig. 2 is a longitudinal or vertical section of the same, and Fig. 3 is a detached side view of one of the knives.

Corresponding parts in the several figures are denoted by like letters.

This invention appertains to certain improvements in vegetable or chopping knives of that class in which a vertical or up-and-down motion is imparted to the operating-handle; and it consists in the construction and detachability of the knives for convenience in removing and sharpening the same, substantially as hereinafter more fully set forth.

In the drawing, A refers to an upright handle, which may be turned in any suitably-configurated form, and with a convenient surface for handling it with the greatest ease. The lower end of this handle is provided with an enlargement, preferably cylindrical in shape, as at $a$. This enlargement $a$ is provided with a series of deep radial slits, $b\,b$, radiating from a central point in the lower side of said enlargement.

B B are the knives or cutters, which are inserted in the slits $b\,b$ in the enlargement $a$ of the handle A, into which they are held detachably by a ring, C, and set-screw $c$, supplied to said ring.

To complete the detachability of the knives, it will be observed that they are provided with shanks $d\,d$, flaring toward the blades thereof, so that as the ring C is moved upwardly it will relax its hold upon said blades or shanks of the knives, and permit them to be removed separately or otherwise, as they need sharpening.

By this construction of the shanks $d$ of the knives, it will be further seen that as the ring C is moved or slipped downwardly it will be wedged in place, and, in turn, wedge or rigidly fasten the knives in place.

The cutter or chopping-knife thus constructed, when in operation, being used in connection with a suitable bowl, the lower or cutting edges of its respective knives are made convex, to conform to the concavity of the bottom of the bowl, and to enable them to effectively perform their work.

Having thus described my invention, I claim and desire to secure by Letters Patent of the United States—

In a chopping-knife for vegetables, &c., the knives B B, having the shanks $d\,d$ flaring downwardly or toward their blades, in combination with the slitted handle A and ring or band C, having a set or adjusting screw, $c$, substantially as shown and described, and for the purpose specified.

In testimony that I claim the foregoing as my own I have hereto affixed my signature in presence of two witnesses.

THORNDIKE LEONARD.

Witnesses:
 JOEL TAFT,
 JENNIE TAFT.